(12) United States Patent
Bolzacchini

(10) Patent No.: US 6,524,177 B2
(45) Date of Patent: Feb. 25, 2003

(54) DEVICE FOR CONNECTING A MEAT PORTIONING-FILLING MACHINE TO A CLIPPING MACHINE

(75) Inventor: Giovanni Bolzacchini, Solarolo di Goito (IT)

(73) Assignee: Inox Meccanica S.r.l., Porto Mantovano (IT)

( * ) Notice: Subject to any disclaimer, the term of this patent is extended or adjusted under 35 U.S.C. 154(b) by 0 days.

(21) Appl. No.: 09/769,324

(22) Filed: Jan. 26, 2001

(65) Prior Publication Data

US 2001/0011005 A1 Aug. 2, 2001

(30) Foreign Application Priority Data

Jan. 31, 2000 (IT) ........................................ MN00A0007

(51) Int. Cl.[7] ............................. A22C 11/00; A22C 13/02
(52) U.S. Cl. ............................... 452/22; 452/30; 452/42
(58) Field of Search .............................. 452/22, 29, 24, 452/30, 41, 42

(56) References Cited

U.S. PATENT DOCUMENTS

| 3,890,675 | A | * | 6/1975 | Nausedas | 452/42 |
| 4,437,209 | A | * | 3/1984 | Duroyon | 452/42 |
| 4,565,054 | A | | 1/1986 | Piereder | |
| 4,651,498 | A | * | 3/1987 | Piereder | 452/42 |

FOREIGN PATENT DOCUMENTS

| EP | 0 621 178 | 10/1994 |
| EP | 0 847 695 | 6/1998 |

* cited by examiner

*Primary Examiner*—Peter M. Poon
*Assistant Examiner*—Joan M. Olszewski
(74) *Attorney, Agent, or Firm*—Guido Modiano; Albert Josif; Daniel O'Byrne

(57) ABSTRACT

A device for connecting a meat portioning-filling machine to a clipping machine, comprising a tube which is adapted to convey the meat and to support the tubular casing to be filled; the tube has, at its output section, a fixed contrast cutter which is adapted to work in cooperation with a cutter provided with an actuation for moving the cutter substantially at right angles to the output section.

7 Claims, 4 Drawing Sheets

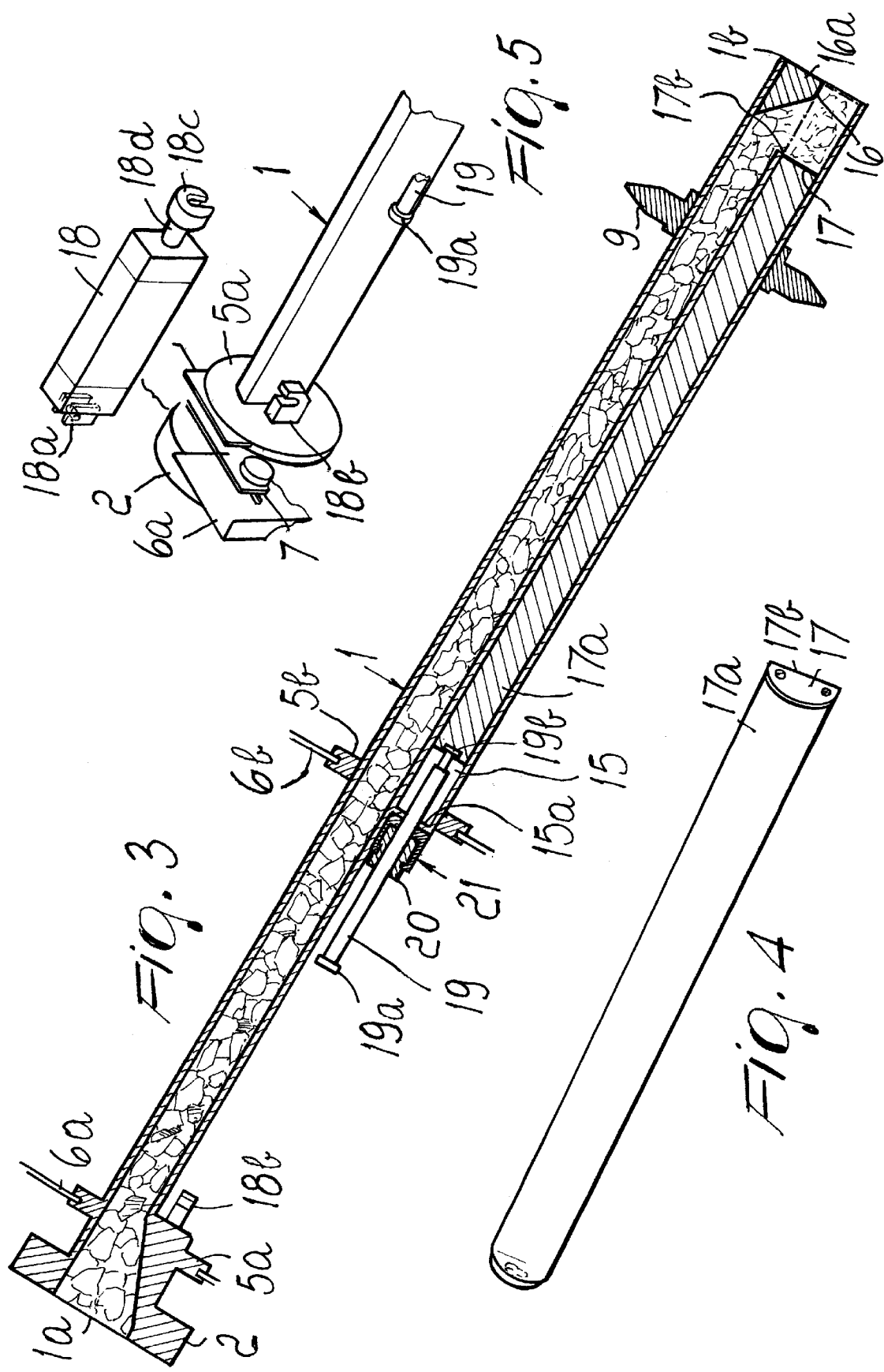

DEVICE FOR CONNECTING A MEAT PORTIONING-FILLING MACHINE TO A CLIPPING MACHINE

BACKGROUND OF THE INVENTION

The invention relates to a device for connecting a meat portioning-filling machine to a clipping machine.

It is known that machines for portioning-filling meat in pieces sequentially prepare the intended portions in order to insert them in a tubular casing, very commonly constituted by intestine; it is also known that there is a device which cleanly cuts any tails of the meat pieces protruding from the rear face of the block that forms the portion, so as to present it to the clipping machine in such a shape as to ensure full operativeness of said machine.

Known devices are rather slow and not fully efficient in their operation; accordingly, the aim of the present invention is to provide a device which has high productivity and is capable of ensuring entirely correct operation.

SUMMARY OF THE INVENTION

This aim is achieved by a device for connecting a meat portioning-filling machine to a clipping machine, according to the invention, characterized in that it comprises a tube which is adapted to convey the meat and to support, at the outer surface and in the presence of braking means, the tubular casing to be filled, said tube having, at its output section toward the clipping machine, a fixed contrast cutter which is adapted to work in cooperation with a cutter provided with means for moving the cutter substantially at right angles to said output section.

BRIEF DESCRIPTION OF THE DRAWINGS

Further characteristics and advantages will become apparent from the description of a preferred but not exclusive embodiment of the device according to the invention, illustrated only by way of non-limitative example in the accompanying drawings, wherein:

FIG. 3 is a longitudinal sectional view of the meat conveyance tube;

FIG. 4 is a view of the cutter associated with the corresponding support;

FIG. 5 is a view of the actuation cylinder, shown removed from its active position;

DESCRIPTION OF THE PREFERRED EMBODIMENTS

Figure 1:
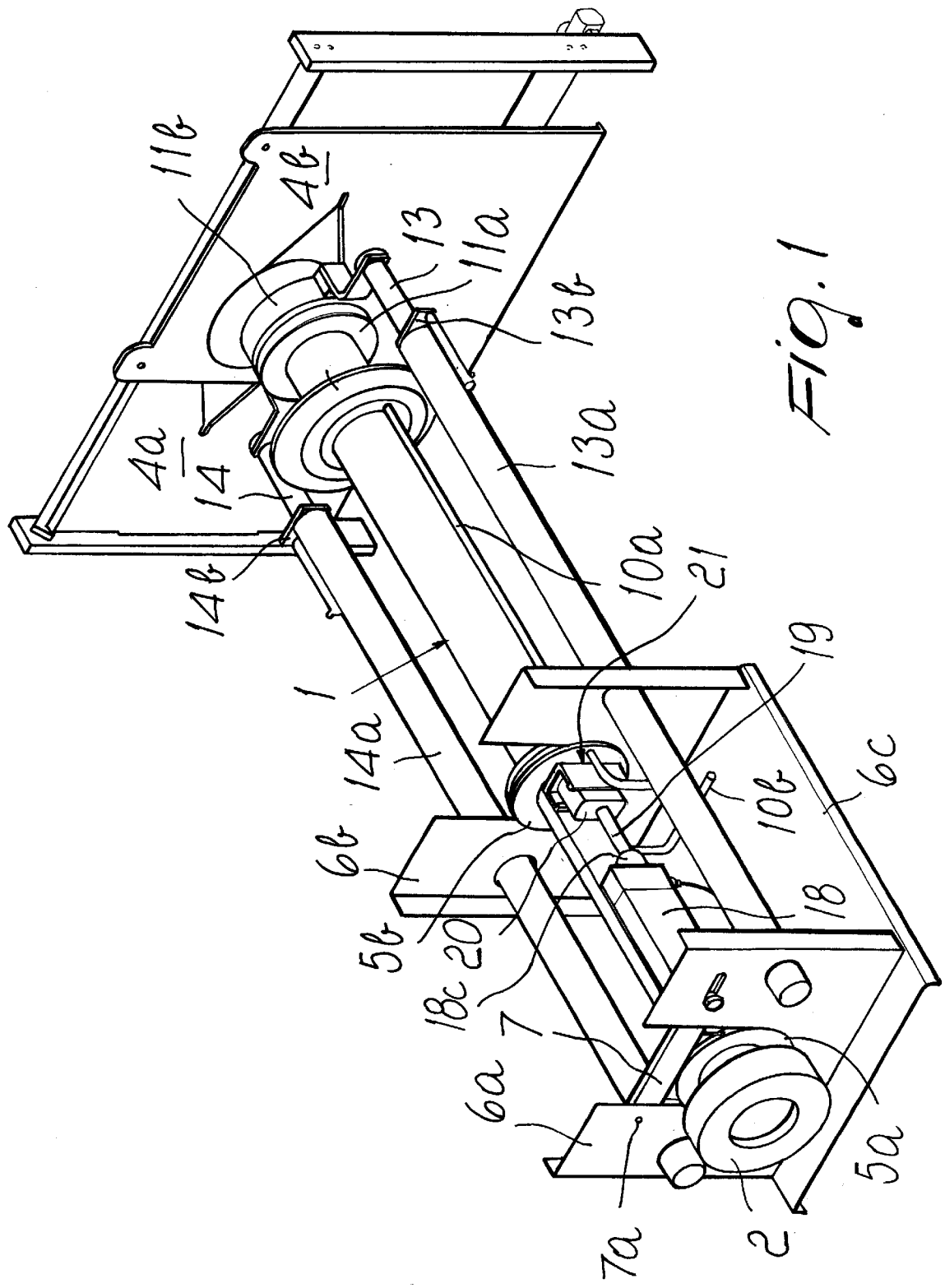
FIG. 1 is a general perspective, schematic view of the device according to the invention.
Figure 2:
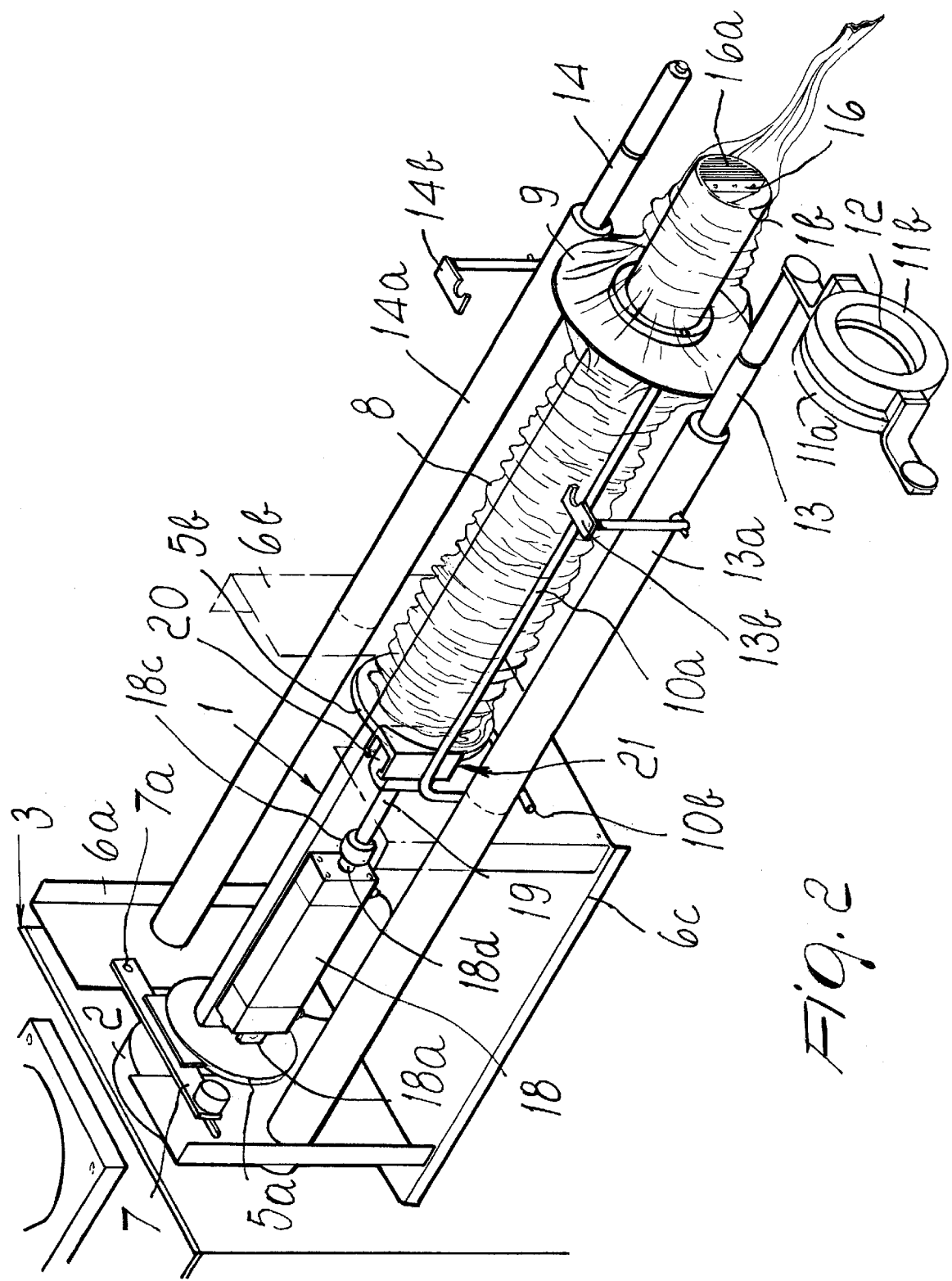
FIG. 2 is a different perspective, schematic view of the device according to the invention, with the intestine ready to begin operation.

With reference to the figures, the reference numeral 1 designates the tube suitable to convey meat in pieces from the end 1a, at the flange 2 for fixing to the portioning-filling machine, generally designated by the reference numeral 3 in FIG. 2, to the end 1b at a clipping machine, of which the separators, designated by the reference numerals 4a and 4b, are shown in FIG. 1.

Said tube 1 is rested, at its flanges 5a and 5b, against the walls 6a and 6b of the supporting structure, which also comprises the bottom 6c, and is locked by means of the latch 7, which is hinged at 7a, thus being easily removable for cleaning.

The tubular casing 8 made of intestine is suitable to be associated with the outer surface of said tube 1 and of the cavity arranged adjacent thereto, which will be described hereafter; the casing passes in contact with the disk 9 at which the ducts 10a and 10b connected to a source of vacuum end, and is subjected to the action of braking means which are constituted in a known manner by the disks 11a and 11b, which are connected to each other so as to support and squeeze the ring 12 of elastic material to gradually deform upon contacting said casing 8.

The assembly formed by the disks 11a and 11b is rotatably supported at the end of the slider 13 inserted in the guide 13a, which is rigidly coupled to the walls 6a and 6b of the supporting structure, and can move from the position shown in FIG. 2, which is assumed at the beginning of operation in order to allow to insert the intestine 8 as shown in said figure, to the position shown in FIG. 1, with the ring 12 in contact with the intestine 8, and rested on the slider 14 inserted in the guide 14a, which is assumed during operation; locking of the sliders 13 and 14 in said position is provided by means of the locking elements 13b and 14b.

The tube 1 is substantially straight, and is provided with a sleeve 15 which is parallel thereto and laterally adjacent, is delimited to the rear by the bottom 15a, and is open onto the inside of the tube 1 toward the end 1b of said tube, where the contrast cutter 16 is located; said cutter is fixed to the support 16a, which is stably associated with the internal surface of the tube 1 and is shaped appropriately in order to avoid stagnation of meat.

The support 17a of the cutter 17 having a cutting edge 17b, is accommodated and guided inside said sleeve 15, and said support is provided with means for moving from the retracted standby position, shown in solid lines in FIG. 3, so as to advance inside the tube 1 and act with the cutter in contact with the contrast cutter 16 towards the end position shown in dot-and-dash lines, to fully cut any tails of the meat portion.

The means for moving the support 17a of the cutter 17 are now described. Such movement means are removably supported by the tube 1 in a continuation of the sleeve 15, within the portion of free space located to the side of the tube 1 at the rear portion of the length whose shape, in cross-section, is a half-circle. It will be noted that said sleeve 15 is laterally adjacent to the front portion of said length.

Such movement means comprise the actuation cylinder 15, being rested with the protrusion 18a on the hood 18bwhich is fixed to the end flange of the tube 1, white the hood 18c, provided at the end of the stem 18d of the piston of said cylinder rests on the end 19a of the rod 19 which is adapted to be detachably connected at its other end 19b to the support 17a of the cutter 17 in manners described hereinafter.

The ease with which the cylinder 18 is removed during cleaning of the device is made evident by FIG. 5, and the same applies to the rod 19.

Said rod 19 is slidingly inserted in a hole which is provided in the block 20 which is adapted to be detachably connected to the guides 21a, 21b of the element 21, which is welded to the bottom 15a of the sleeve 15; said element 21 and said bottom 15a have a hole which allows the passage of the rod 19, as shown in FIG. 3, the hole being shaped like a slot which is elongated in the direction of the guides 21a, 21b.

Figure 6:
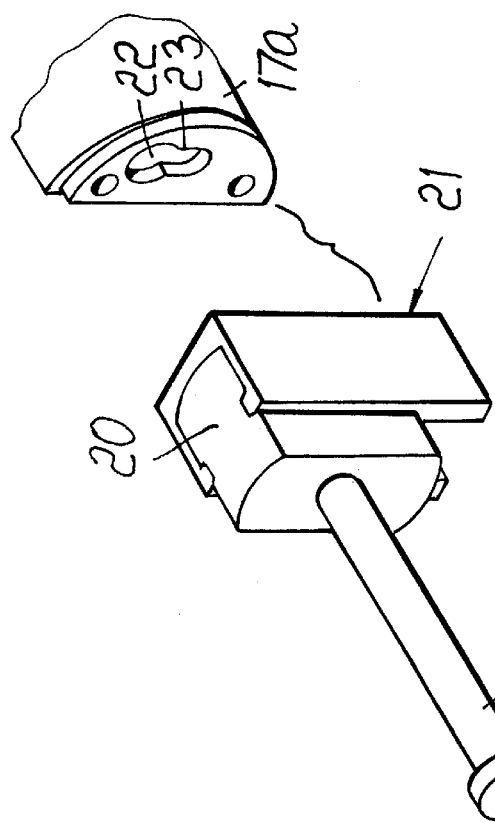
FIGS. 6 to 9 show, in succession, different steps for the assembling of a part of the device according to the invention.
Figure 7:
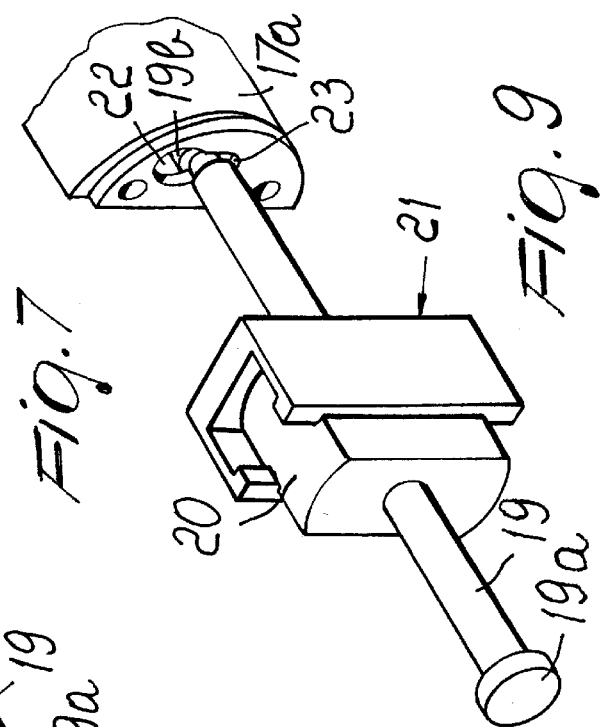

In order to connect the rod 19 to the support 17a, the block 20 is moved, as shown in FIG. 6, toward the element 21, keeping the rod 19 with the end 19b within said block, and assuming the position of FIG. 7, in which the end of the rod 19 faces the upper region of the slotted hole provided in the element 21 and in the bottom 15a and the wider portion 22 of the hole for accessing an end cavity which is present at the end of said support 17a.

Figure 8:
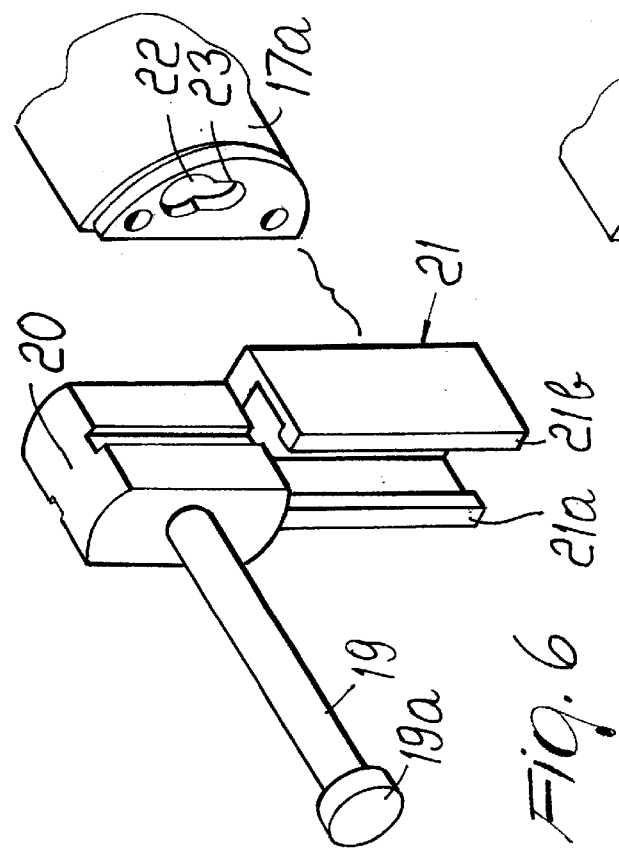
Figure 9:
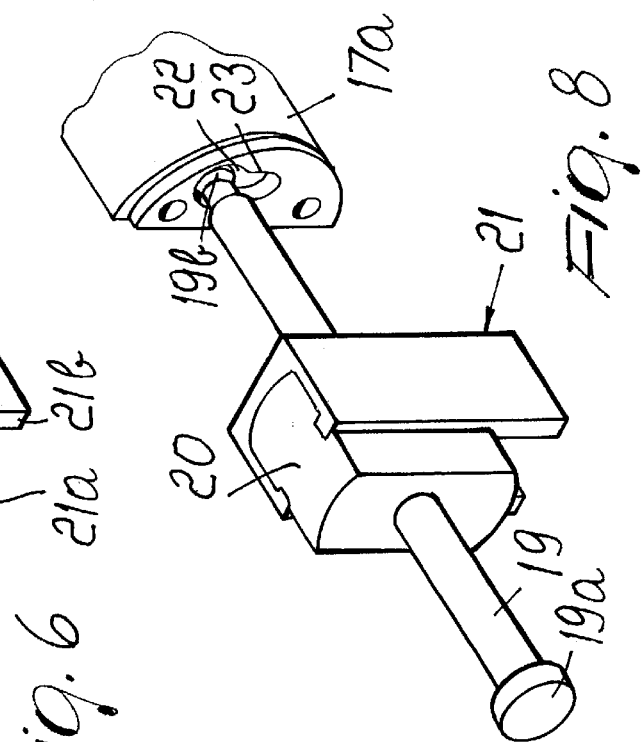

It is thus possible to produce the translation movement of the rod 19 until its end 19b enters said cavity present in the support 17a, as shown in FIG. 8, and complete the engagement at the narrower portion 23 of the hole for access to the end cavity by further lowering of the block 20 in the element 21, as shown in FIG. 9.

The described invention is susceptible of numerous modifications and variations, all of which are within the scope of the appended claims; all the details may further be replaced with other technically equivalent elements.

The disclosures in Italian Patent Application No. MN2000A000007 from which this application claims priority are incorporated herein by reference.

What is claimed is:

1. A device for connecting a meat portioning-filling machine to a clipping machine, comprising: a supporting structure; a tube, supported at said supporting structure for conveying meat along a meat conveyance direction, and to support, at an outer surface thereof, a tubular casing to be filled; braking means arrangeable at the outer surface at said tube for exerting a braking action on the tubular casing; a fixed contrast cutter located at an output section of said tube directed toward the clipping machine; a cutter adapted to work in cooperation with said contrast cutter; and movement means for moving said cutter substantially at right angles to said tube output section and parallel to the meat conveyance direction, the device further comprising: a sleeve which is located laterally adjacent said tube along a length thereof which is proximate to said output section; a fixed support, at which the contrast cutter is fixed, and which is stably associated at an internal surface of the tub near said output section, said fixed support being shaped appropriately to avoid meat stagnation; a movable support having fixed at a front end thereof said cutter; and said movement means for moving said movable support inside said sleeve, said sleeve extending with a longitudinal axis of the tube, said sleeve end opening inside said tube so as to allow the cutter to enter the tube.

2. The device of claim 1, wherein said support movement means are guidingly supported by the meat conveyance tube.

3. The device of claim 2, wherein said support movement means are detachably supported by said meat conveyance tube.

4. The device of claim 2, wherein said meat conveyance tube comprises a segment with a reduced cross-sectional passage, said passage being flanked by said sleeve for guiding said movable support for the cutter and by said movement means for moving said movable support.

5. The device of claim 4, wherein said movement means for moving the movable support comprise: an actuation cylinder which is removably connected to said meat conveyance tube, and has a piston and a stem with a protruding stem end; and a rod, to which said stem end is detachably connected, said rod being further detachably connected to a cavity located at a rear end of said movable support.

6. The device of claim 5, further comprising: a block, to which said rod is slidingly associated, said block being further detachably connected to a bottom end of said sleeve and being slidingly movable inside said block until it is brought to a position in which a terminal end thereof faces an upper region of a slotted hole provided in said sleeve bottom and an opening of said cavity which is provided at the rear end of said movable support, whereby to allow the terminal end of the rod to enter said cavity and be locked thereat.

7. The device of claim 1, wherein said the meat conveyance tube is detachably connected to a said supporting structure to which said braking means for braking the tubular casing located on said tube are also connected.

* * * * *